US006954881B1

(12) United States Patent
Flynn Jr. et al.

(10) Patent No.: US 6,954,881 B1
(45) Date of Patent: Oct. 11, 2005

(54) METHOD AND APPARATUS FOR PROVIDING MULTI-PATH I/O IN NON-CONCURRENT CLUSTERING ENVIRONMENT USING SCSI-3 PERSISTENT RESERVE

(75) Inventors: John T. Flynn Jr., Morgan Hill, CA (US); Richard H. Johnson, Cupertino, CA (US); Limei M. Shaw, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 545 days.

(21) Appl. No.: 09/687,335

(22) Filed: Oct. 13, 2000

(51) Int. Cl.[7] .............................................. G06F 11/00
(52) U.S. Cl. ......................................... 714/43; 714/44
(58) Field of Search ........................... 714/3–5, 43–45, 714/7; 710/10, 17, 19

(56) References Cited

U.S. PATENT DOCUMENTS

| | | | |
|---|---|---|---|
| 4,207,609 A | 6/1980 | Luiz et al. ................... 711/150 |
| 4,445,605 A | 5/1984 | Cormier et al. ............. 710/129 |
| 5,768,623 A | 6/1998 | Judd et al. ................... 710/131 |
| 5,790,775 A * | 8/1998 | Marks et al. ................... 714/9 |
| 5,828,876 A | 10/1998 | Fish et al. ................... 395/857 |
| 5,867,736 A | 2/1999 | Jantz ........................... 710/38 |
| 5,892,955 A | 4/1999 | Ofer ............................... 714/3 |
| 5,909,595 A | 6/1999 | Rosenthal et al. .......... 395/858 |
| 5,925,120 A | 7/1999 | Arp et al. .................... 710/129 |
| 5,937,428 A | 8/1999 | Jantz ........................... 710/129 |
| 5,961,624 A | 10/1999 | Takayama .................... 711/114 |
| 6,009,535 A * | 12/1999 | Halligan et al. ................ 714/5 |
| 6,021,454 A | 2/2000 | Gibson ....................... 395/894 |
| 6,052,795 A * | 4/2000 | Murotani et al. .............. 714/3 |
| 6,073,188 A | 6/2000 | Fleming ...................... 395/601 |
| 6,073,218 A | 6/2000 | DeKoning et al. .......... 364/200 |
| 6,115,772 A | 9/2000 | Crater ......................... 364/200 |
| 6,145,028 A * | 11/2000 | Shank et al. ................. 710/31 |
| 6,151,684 A * | 11/2000 | Alexander et al. ............. 714/4 |

(Continued)

FOREIGN PATENT DOCUMENTS

| | | | |
|---|---|---|---|
| EP | 1 035 465 | 9/2000 | .................... 714/6 |
| EP | 1 117 042 | 8/2001 | .................... 714/6 |
| JP | 06-044181 | 2/1994 | |
| JP | 08-314843 | 11/1996 | |
| JP | 09-062452 | 3/1997 | |
| JP | 11-306126 | 11/1999 | |
| JP | 11-345175 | 12/1999 | |
| JP | 2000-047950 | 2/2000 | |

OTHER PUBLICATIONS

"SCSI Command Reference 2105 Models E10, E20, F10 and F20" XP–002194637, IBM Enterprise Storage Server, Second Edition, Jun. 2000.

" IBM TotalStorage Enterprise Storage Server Subsystem Device Driver User's Guide" XP–002194638, Document No. GC26–7442–01.

"Takeover Scheme for Control of Shared Disks" IBM Technical Disclosure Bulletin, vol. 32, No. 2, Jul. 1989.

IBM Enterprise StorageServer: SCSI Command Reference, SC26–7297–01, pp. i–146, Jun. 2000.

*Primary Examiner*—Nadeem Iqbal
*Assistant Examiner*—Timothy M. Bonura
(74) *Attorney, Agent, or Firm*—Crawford Maunu PLLC

(57) ABSTRACT

A method and apparatus for providing multi-path I/O in non-concurrent clustering environment is disclosed. Shared non-concurrent access to logical volumes through multiple paths is provided by using SCSI-3 persistent reserve commands. Open options of the operating system are mapped to SCSI persistent reserve commands to allow all of the multiple paths to register with the logical unit number of the shared storage system and to allow the second of the multiple paths to access the logical unit number of the shared storage system after obtaining a persistent reservation with the shared storage system.

38 Claims, 12 Drawing Sheets

U.S. PATENT DOCUMENTS

| | | | |
|---|---|---|---|
| 6,182,167 B1 | 1/2001 | Basham et al. | 710/38 |
| 6,256,695 B1 * | 7/2001 | Williams | 710/107 |
| 6,286,056 B1 | 9/2001 | Edgar et al. | 710/5 |
| 6,397,356 B1 * | 5/2002 | Yonezawa | 714/43 |
| 6,408,343 B1 * | 6/2002 | Erickson et al. | 710/15 |
| 6,532,547 B1 * | 3/2003 | Wilcox | 714/5 |
| 6,574,751 B1 * | 6/2003 | Lee | 714/21 |
| 6,574,755 B1 * | 6/2003 | Seon | 714/56 |
| 6,728,905 B1 * | 4/2004 | Gnanasivam et al. | 714/43 |
| 6,772,231 B2 * | 8/2004 | Reuter et al. | 710/8 |

* cited by examiner

METHOD AND APPARATUS FOR PROVIDING MULTI-PATH I/O IN NON-CONCURRENT CLUSTERING ENVIRONMENT USING SCSI-3 PERSISTENT RESERVE

BACKGROUND OF THE INVENTION

1. Field of the Invention

This invention relates in general to accessing storage arrays with SCSI or FCP (Fibre Channel Protocol) host devices, and more particularly to a method and apparatus for providing multi-path I/O in non-concurrent clustering environment using SCSI-3 persistent reserve.

2. Description of Related Art.

Disk drive systems have grown enormously in both size and sophistication in recent years. These systems can typically include many large disk drive units controlled by a complex multi-tasking disk drive controller. A large scale disk drive system can typically receive commands from a number of host computers and can control a large number of disk drive mass storage elements, each mass storage unit being capable of storing in excess of several gigabits of data.

The Small Computer System Interface (SCSI) is a communications protocol standard that has become increasingly popular for interconnecting computers and other input/output devices. The first version of SCSI (SCSI-1) is described in ANSI X3.131-1986. The SCSI standard has underdone revisions as drive speeds and capacities have increased, but certain limitations remain.

According to the SCSI protocol, host devices (e.g., a work station) and target devices (e.g., a hard disk drive) are connected to a single bus in daisy-chain fashion. Each device on the bus, whether a host or a target, is assigned a unique ID number. The number of devices which may be connected to the bus is limited by the number of unique ID numbers available. For example, under the SCSI-1 protocol, only eight devices could be connected to the SCSI bus. Later versions of the SCSI protocol provided for sixteen devices, and future versions will undoubtedly facilitate the connection of an even greater number of devices to a single SCSI bus.

In addition to limiting the number of devices that may be attached to a single SCSI bus, the protocol also limits the number of logical units (e.g. individual drives) that may be accessed through a particular target number. For example, according to the SCSI-1 standard, the number of logical units per target device was also limited to eight. Thus, a particular target (e.g., a disk array) could provide access to eight logical units (disk drives), the target number and the logical unit number uniquely identifying a particular storage device on the SCSI system. The SCSI-3 specification is designed to further improve functionality and accommodate high-speed serial transmission interfaces. To do so, SCSI is effectively "layered" logically. This layering allows software interfaces to remain relatively unchanged while accommodating new physical interconnect schemes based upon serial interconnects such as Fibre Channel and Serial Storage Architecture (SSA).

In order to increase the number of hosts which can access a particular target storage device, multiple SCSI busses have been connected together in a multi-level tree structure, with routing devices passing data and commands between levels. In such multi-level networks, hosts suffer performance delays when accessing devices which are more than one level away. Additionally because of the above described limitations, current SCSI systems are unable to take advantage of the benefits offered by current storage arrays, which provide parallel access to a large number of storage devices. For example, the number of storage devices may exceed the available number of target and logical unit numbers available on the SCSI system. Furthermore, each SCSI bus may be used by only one host at a time, thus preventing parallel access to the storage array by any two hosts on the same SCSI bus. Hosts on different levels of a multi-level system can access different devices on a storage array in parallel, but such parallel access increases the complexity and cost of the routers which interconnect the levels.

As can be seen, the growth of computer use has created an increasing demand for flexible, high availability systems to store data for the computer systems. Many enterprises have a multiplicity of host computer systems including personal computers and workstations that either function independently or are connected through a network. It is desirable for the multiple host systems to be able to access a common pool of multiple storage systems so that the data can be accessed by all of the host systems. Such an arrangement increases the total amount of data available to any one host system. Also, the work load can be shared among the hosts and the overall system can be protected from the failure of any one host.

As the systems grow in complexity, it is increasingly less desirable to have interrupting failures at either the disk drive or at the controller level. As a result, systems have become more reliable and the mean time between failures continues to increase. Nevertheless, it is more than an inconvenience to the user should the disk drive system go "down" or off-line; even though the problem is corrected relatively quickly, meaning within hours. The resulting lost time adversely affects not only system throughput performance, but user application performance. Further, the user is not concerned whether it is a physical disk drive, or its controller which fails, it is the inconvenience and failure of the system as a whole which causes user difficulties.

Therefore, it is desirable to provide redundant paths to protect against hardware failures so that performance and high availability can be guaranteed for the data accesses. Previous solutions for allowing multiple hosts to access multiple computer systems have used a combination of host adapter cards, out board disk controllers, and standard network communication systems.

Many disk drive systems rely upon standardized buses, such as the above-mentioned SCSI bus, to connect the host computer to the controller, and to connect the controller and the disk drive elements. Thus, should the disk drive controller connected to the bus fail, the entire system, as seen by the host computer, fails and the result is, as noted above, unacceptable to the user.

To address this problem, a disk drive controller system having redundant operations may be spread between at least two SCSI adaptors connected to a SCSI bus. At least one host computer may also be connected to the SCSI bus. If one of the SCSI adaptors fails, the other SCSI adaptor connected to the bus, upon detecting the failure, takes over for the devices serviced by the failing SCSI adaptor.

In such a network, servers can be linked to provide high availability cluster multiprocessing Clustering servers enables parallel access to data, which can help provide the redundancy and fault resilience required for business-critical applications. High availability cluster multiprocessing may use SCSI's Reserve/Release to control access to disk storage devices when operating in non-concurrent mode. In non-concurrent mode, only a single cluster node may access data in a logical volume. High availability cluster multiprocessing provides a way to fail over access to this data to another cluster node because of hardware or software failures. However, it is desirable to prevent node failover if possible, while providing access to the storage system.

It can be seen that there is a need for a method and apparatus for providing multi-path I/O in non-concurrent clustering environment.

SUMMARY OF THE INVENTION

To overcome the limitations in the prior art described above, and to overcome other limitations that will become apparent upon reading and understanding the present specification, the present invention discloses a method and apparatus for providing multi-path I/O in non-concurrent clustering environment.

The present invention solves the above-described problems by providing shared non-concurrent access to logical volumes through multiple paths using SCSI-3 persistent reserve commands.

A method in accordance with the principles of the present invention includes mapping open options of the operating system to SCSI persistent reserve commands to allow all of the multiple paths to register with the logical unit number of the shared storage system and to allow the second of the multiple paths to access the logical unit number of the shared storage system after obtaining a persistent reservation with the shared storage system.

Other embodiments of a method in accordance with the principles of the invention may include alternative or optional additional aspects. One such aspect of the present invention is that the mapping open options of the operating system to SCSI persistent reserve commands to allow all of the multiple paths to register with the logical unit number of the shared storage system further comprises registering all paths from a first host with the logical unit number of the shared storage system using a single reservation key.

Another aspect of the present invention is that the mapping open options of the operating system to SCSI persistent reserve commands further comprises obtaining information about persistent reservations and reservation keys.

Another aspect of the present invention is that the obtaining information about persistent reservations and reservation keys further comprises using a reservation in command.

Another aspect of the present invention is that the reservation in command comprises a read key service action and a read reservation service action.

Another aspect of the present invention is that the mapping open options of the operating system to SCSI persistent reserve commands further comprises issuing a persistent reserve out command for initiating an action with the logical unit number of the shared storage system.

Another aspect of the present invention is that the persistent reserve out command for initiating an action with a logical unit number of the shared storage system further comprises a service action chosen from the group consisting of register, reserve, release, clear, preempt and preempt with abort.

Another aspect of the present invention is that the register service action comprises an add and a remove option.

Another aspect of the present invention is that the add option further includes registering each path when configuring, determining whether a first registration attempt was a success, attempting a second registration attempt when the first registration attempt was not a success, setting a state for the path as being dead when the second registration attempt is unsuccessful and ignoring the path when the path has a state set to dead and setting a state for the path to true when the first or second registration attempt is successful.

Another aspect of the present invention is that the remove option further includes determining whether a path has a persistent reservation, issuing a persistent reserve out with service option release set when the path is determined to have a persistent reservation and releasing the reservation when the path is determined to not have a persistent reservation.

Another aspect of the present invention is that the reserve service action includes deciding whether a device needs to make a reservation to the logical unit number of the shared storage system by examining whether a command parameter is set, defaulting to a reserve required when a command parameter is not set and implementing a persistent reserve to the logical unit number of the shared storage device when no initiator has reserved the logical unit number of the shared storage device and when a command parameter is set executing the command parameter.

Another aspect of the present invention is that the command parameter is a forced open option, the forced open option causing the device to read the current reservation key, preempt and about queued tasks when the current reservation key does not match the device's reservation key.

Another aspect of the present invention is that the method further includes preventing SCSI-2 reservations by setting the command parameter to no reserve, determining whether the forced open completes successfully, setting the device's reservation flag to the path index that made the persistent reservation and opening all paths with no SCSI-2 reserve option set when the forced open command complete successfully, and issuing an error code when the forced open command does not complete successfully.

Another aspect of the present invention is that the command parameter is a retain reservation option, the retain reservation causing the device to read the current reservation key, determine whether a key is returned, establish that the logical unit number is not reserved by an initiator and make persistent reservation when a key is not returned.

Another aspect of the present invention is that the retain reservation option causes the device to determine whether a returned key matches a reservation key for the device, to issue an error code when the returned key does not match the reservation key for the device, and when the returned key matches the reservation key for the device open all paths with a no SCSI-2 reserve option set, set a reserve flag to the path index that made the persistent reservation, set the retain reserve to true and check a retain reserve field at close to determine if persistent reserve should be released.

Another aspect of the present invention is that the command parameter is a no reserve option, the no reserve option causing the device to read the current reservation key, determine whether a key is returned, establish that the logical unit number is not reserved by an initiator and opening all paths with original command parameter from a host.

Another aspect of the present invention is that the no reserve option causes the device to determine whether a returned key matches a reservation key for the device, to issue an error code when the returned key does not match the reservation key for the device, and when the returned key matches the reservation key for the device issue a persistent reserve out with release.

Another aspect of the present invention is that the command parameter is a default reserve option, the default reserve option causing the device to check all paths, determine whether any paths are unregistered, register all unregistered paths, ignoring any paths that do not register successfully, return and read a reservation key, issuing an error code when the returned reservation key does not match a reservation key of the device and open all registered paths with no SCSI-2 reserve set.

Another aspect of the present invention is that the default reserve option causes the device when a key is not returned to select a registered path, issue a persistent reserve for the selected registered path, ignoring the path is the persistent reservation is not successful, and when the persistent reservation is successful marking a reserve field with the path index that made the reservation and open all registered paths with the command parameter set to no SCSI-2 reserve.

Another aspect of the present invention is that the command parameter is a single option, the single option causing the device to check all paths, determine whether any paths are unregistered, register all unregistered paths, ignoring any paths that do not register successfully, return and read a reservation key, issuing an error code when the returned reservation key does not match a reservation key of the device and open all registered paths with no reserve set.

Another aspect of the present invention is that the single option causes the device when a key is not returned to select a registered path, issue a persistent reserve for the selected registered path, ignoring the path is the persistent reservation is not successful, and when the persistent reservation is successful marking a reserve field with the path index that made the reservation and open all registered paths with the command parameter set to no reserve.

Another aspect of the present invention is that the release service action includes closing all paths not reserved with a retain reservation option set, opening a path with a retained reservation flag set and issuing a persistent reserve out command with a release service action set to release a persistent reservation for a path.

In another embodiment of the invention, a method for supporting SCSI persistent reserve commands by a shared storage system is provided. The method includes processing reservation keys to identify registered hosts and processing persistent reservation commands to control access by a host.

Another aspect of the present invention is that the processing of persistent reservation commands comprises allowing all of the multiple paths to register with the logical unit number of the shared storage system.

Another aspect of the present invention is that the method further includes registering all paths from a first host with the logical unit number of the shared storage system using a single reservation key.

Another aspect of the present invention is that the processing reservation keys comprises obtaining information about persistent reservations and reservation keys.

Another aspect of the present invention is that the obtaining information about persistent reservations and reservation keys further comprises using a reservation in command.

Another aspect of the present invention is that the reservation in command comprises a read key service action and a read reservation service action.

Another aspect of the present invention is that the processing of persistent reservation commands comprises issuing a persistent reserve out command for initiating an action with the logical unit number of the shared storage system.

Another aspect of the present invention is that the persistent reserve out command for initiating an action with a logical unit number of the shared storage system further comprises a service action chosen from the group consisting of register, reserve, release, clear, preempt and preempt with abort.

In another embodiment of the present invention a driver for mapping open options of the operating system to SCSI persistent reserve commands is provided. The driver is configured to process reservation keys to identify registered hosts and to process persistent reservation commands to control access by a host.

Another aspect of the present invention is that the driver processes persistent reservation commands by allowing all of the multiple paths to register with the logical unit number of the shared storage system.

Another aspect of the present invention is that the driver registers all paths from a first host with the logical unit number of the shared storage system using a single reservation key.

Another aspect of the present invention is that the driver processes reservation keys by obtaining information about persistent reservations and reservation keys.

Another aspect of the present invention is that the driver obtains information about persistent reservations and reservation keys by using a reservation command.

Another aspect of the present invention is that the reservation command comprises a read key service action and a read reservation service action.

Another aspect of the present invention is that the driver processes persistent reservation commands by issuing a persistent reserve out command for initiating an action with the logical unit number of the shared storage system.

Another aspect of the present invention is that the persistent reserve out command for initiating an action with a logical unit number of the shared storage system further comprises a service action chosen from the group consisting of register, reserve, release, clear, preempt and preempt with abort.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for providing multi-path I/O in non-concurrent clustering environment. Shared non-concurrent access to logical volumes through multiple paths is provided by using SCSI-3 persistent reserve commands.

Figure 1:
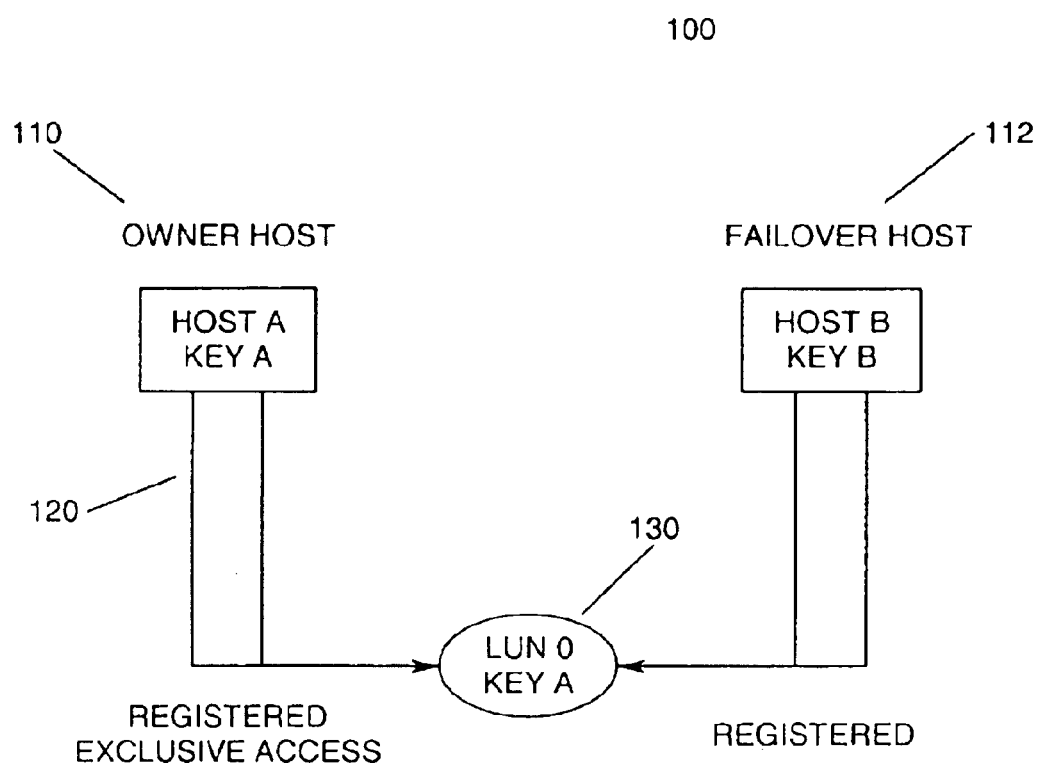
FIG. 1 illustrates a block diagram illustrating the environment for the present invention.

FIG. 1 illustrates a block diagram 100 illustrating the environment for the present invention. In FIG. 1, a storage system illustrated by the LUN (logical unit number) may be accessed by a plurality of hosts. In FIG. 1, two hosts 110, 112 are shown. However, those skilled in the art will recognize that the present invention is not meant to be limited to an environment where only two hosts access the storage system.

Both the owner host 110 and the failover host 112 include at least two paths 120 for accessing LUN 0 130. Both the owner host 110 and the failover host 112 are registered with LUN 0 130. However, owner host 110 has exclusive access to LUN 0 as indicated by LUN 0 having KEY A which is the key for the owner host 110.

SCSI Reserve/Release to control access to disk storage devices when operating in non-concurrent mode. In non-concurrent mode, only the owner host 110 has access to data in LUN 0 130. If a hardware or software failure occurs, failover access may occur so that the failover host 112 can access the data on LUN 130. However, it is desirable to prevent node failover if possible. Because each node 110, 112 has multiple I/O paths 120 to the shared storage devices, I/O traffic can be switched to an alternate path if hardware in an individual I/O path fails. This obviates the need to perform the more disruptive node failover.

Figure 2:
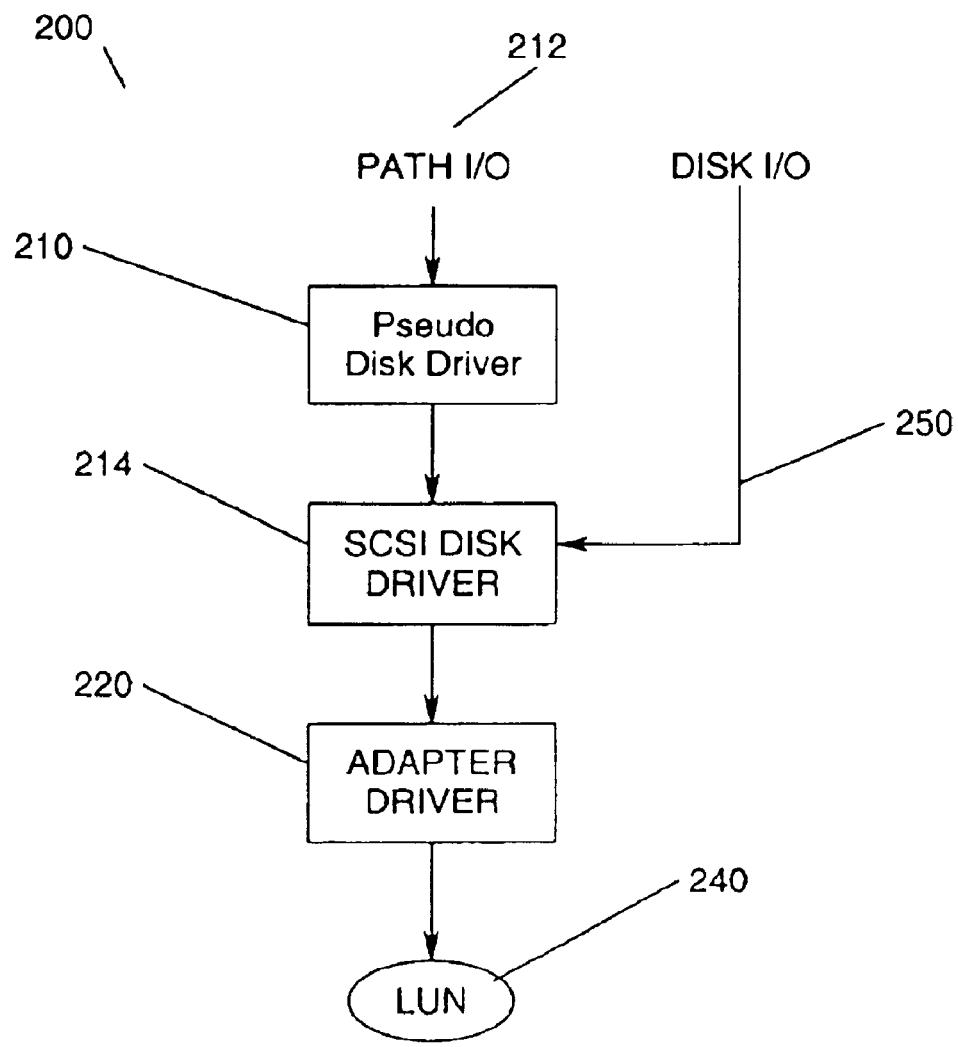
FIG. 2 illustrates a pseudo device driver in the operating system to map open options to appropriate SCSI-3 Persistent Reserve commands for controlling access to shared storage devices.

FIG. 2 illustrates a pseudo device driver 200 in the operating system to map open options to appropriate SCSI-3 Persistent Reserve commands for controlling access to shared storage devices. According to the present invention, a new device driver is introduced into the operating system that provides a single pseudo device 210 for all the multiple paths to a single shared device 240. In FIG. 2, a pseudo device driver 210 is provided for providing path selection and path retry by mapping the open options to appropriate SCSI-3 Persistent Reserve commands. The pseudo device driver 210 provides shared non-concurrent access to logical volumes and provides multiple path access to the device. This provides the added benefit of I/O load balancing to the device paths and also lets path failover to be used to prevent a node from performing a node failover when an I/O error occurs on a single device path. The pseudo device driver 210 converts operating system requests 212 into requests that the SCSI disk driver 214 can process. The SCSI disk driver 214 converts the input/output (I/O) requests into Command Descriptor Blocks (CDBs). The SCSI disk driver 214 calls the adapter driver 220 and CDBs are presented to the adapter driver 220 to initiate I/O requests to the LUN 240. The host may bypass the pseudo disk driver 210 through the operating system configuration. In this manner, disk I/O requests 250 are processed without providing SCSI Reserve/Release to provide access to disk storage devices without failover when one of multiple paths to a LUN 240 fails.

Figure 3:
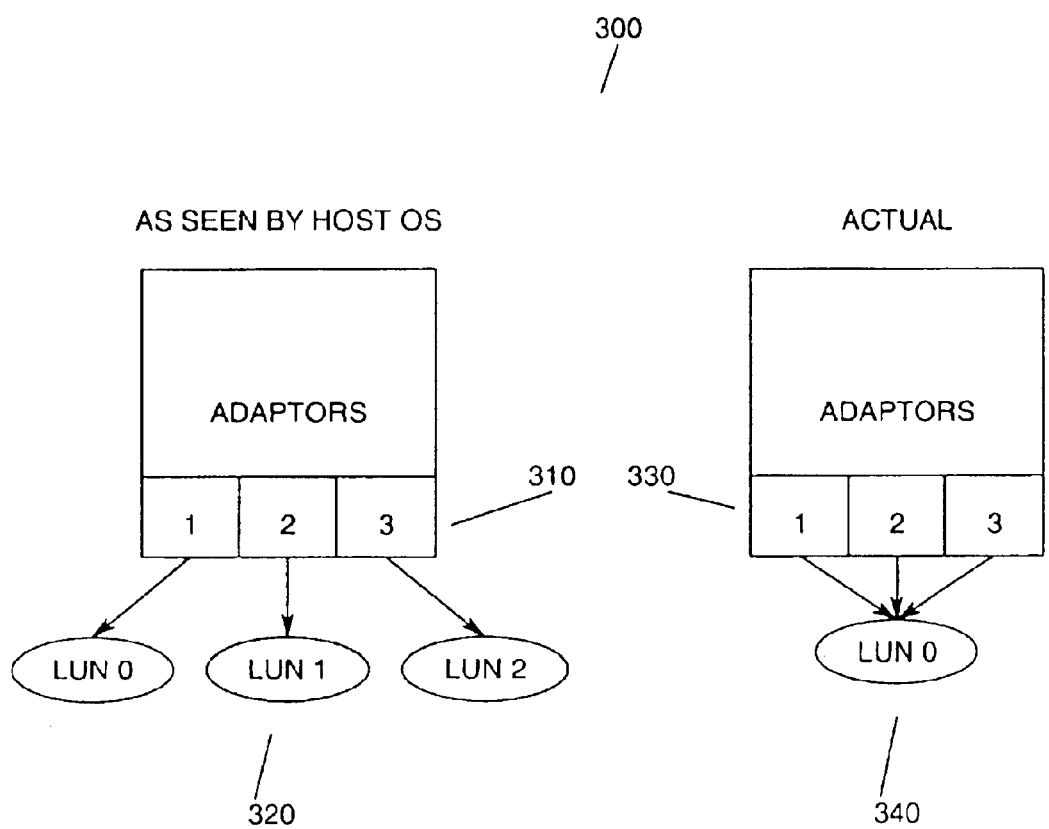
FIG. 3 illustrates a block diagram that shows the shared LUN problem.

FIG. 3 illustrates a block diagram 300 that shows the shared LUN problem. The host sees multiple adapters 310 accessing multiple LUNs 320. However, the adapters 330 are actually mapped to a single LUN 340.

Thus, according to the present invention the implementation of SCSI-3 persistent reserve commands in a pseudo device driver allows for support of both single path to a LUN and multiple paths to a LUN configuration. With the single path configuration, Reserve/Release function to a LUN is implemented by SCSI-2 normal Reserve/Release command at the system disk driver level.

To implement this command in multipath configuration environment, all paths to a LUN on one host have to register with a LUN under the same Reservation Key, and only one of the paths needs to make the persistent reserve to the LUN with the reservation type of 'Exclusive Access, Registrants Only' at open time. All paths to the LUN from other hosts can register to the LUN all the time, but must be required to get persistent reservation to this LUN before they can access it. With this reservation type, all the paths on one host, which are registered to that LUN can share and access this LUN. If this pseudo device driver is applied to a storage subsystem which does not support SCSI-3 Persistent Reserve commands, the pseudo device driver will switch to single path function automatically with a multiple path configuration of storage subsystem.

SCSI-3 Persistent Reserve supports 2 commands. One is Persistent Reserve In, This command is used to obtain information about persistent reservations and reservation keys that are active on a LUN. Two service action supported by Persistent Reserve In command are 'Read keys' and "Read Reservation", Another command is Persistent Reserve Out. This command is used to register with the LUN, make reservation to the LUN, release reservation to a LUN, preempt other initiator's reservation of a LUN, and clear all the reservation keys and persistent reservation from a LUN. Six service actions supported by Persistent Reserve Out command are "Register", "Reserve", "Release", "Clear", "Preempt", "Register & Ignore Existing Key" and "Preempt & Abort."

Figure 4:
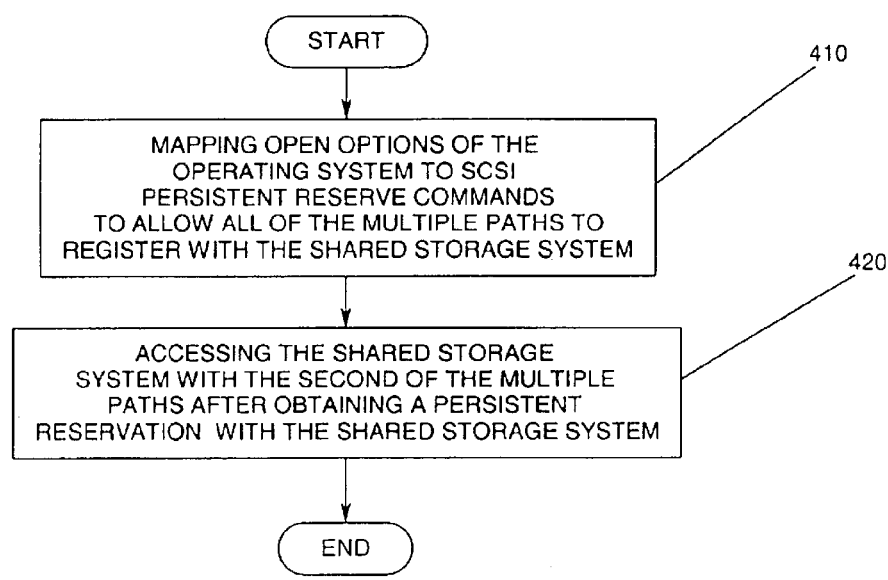
FIG. 4 illustrates a flow chart of the present invention.

FIG. 4 illustrates a flow chart 400 of the present invention. First, open options of the operating system are mapped to SCSI persistent reserve commands to allow all of the multiple paths to register with the shared storage system 410. The second of the multiple paths is then allowed to access the shared storage system after obtaining a persistent reservation with the shared storage system 420. All paths from a first host are registered with the shared storage system using a single reservation key (see FIG. 1 also). Information about persistent reservations and reservation keys may be obtained by a host. A reservation in command is used to obtain the information about persistent reservations and reservation keys. The reservation in command includes a read key service action and a read reservation service action. A persistent reserve out command is issued for initiating an action with the shared storage system. The persistent reserve out command includes a service action chosen from the group consisting of register, reserve, release, clear, preempt and preempt with abort. The reserve service action includes an add and a remove option.

Figure 5:
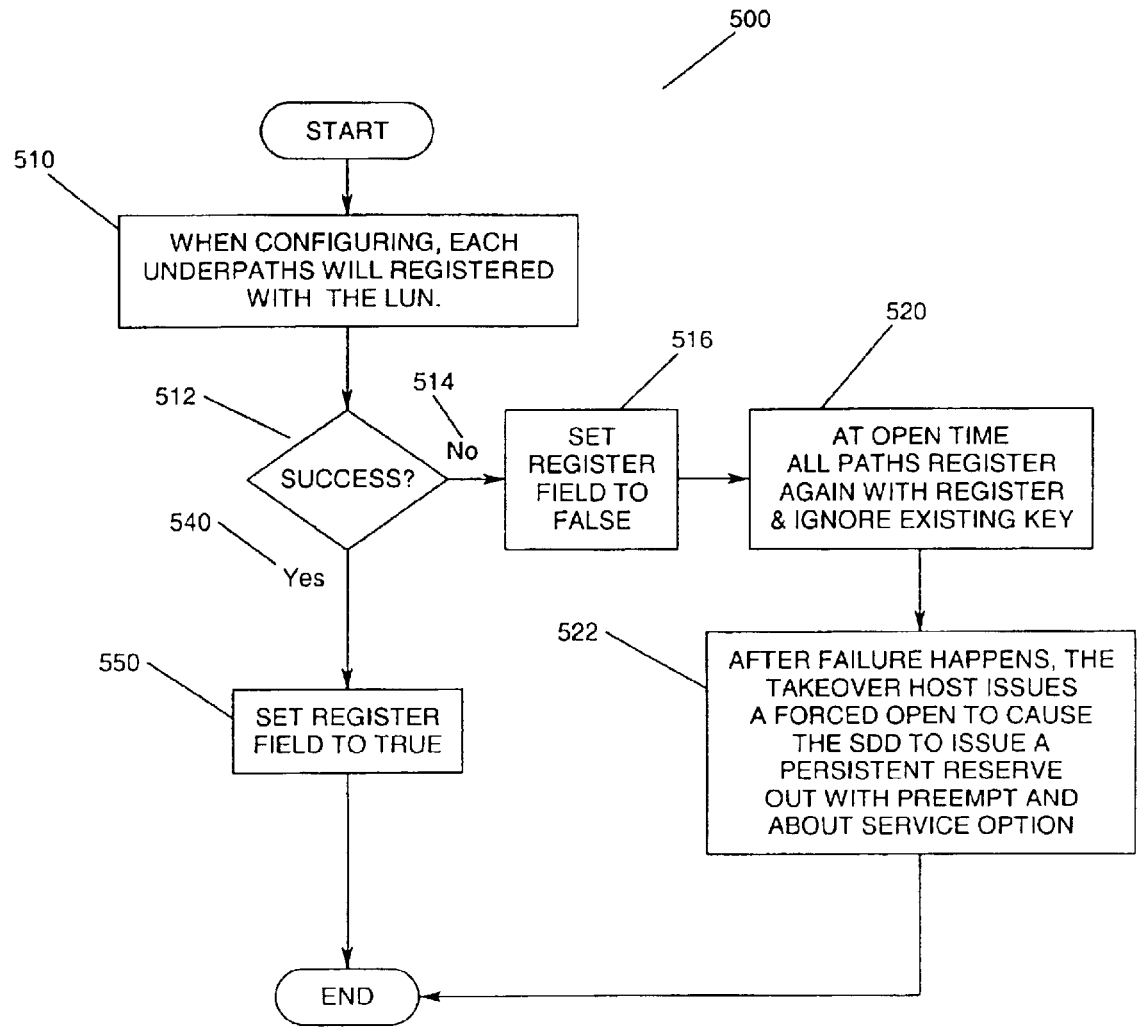
FIG. 5 illustrates a flow chart of an add option for registering with a LUN.

FIG. 5 illustrates a flow chart 500 of an add option for registering with a LUN. When configuring, each underpaths will registered with the LUN 510. A determination is made whether the registration is a success 512. If a path registered successfully 540, its 'registered' field is set to TRUE 550. If it fails at this time 514, its 'registered' field is set to FALSE 516. At open time, all paths register again with "Register & Ignore Existing Key" 520. After failure happens, the takeover host issues "forced open", which causes the SDD to issue a Persistent Reserve Out with "Preempt & Abort" service option command 522. This command will then clear all registrations keys which match the preempted reservation key.

Figure 6:
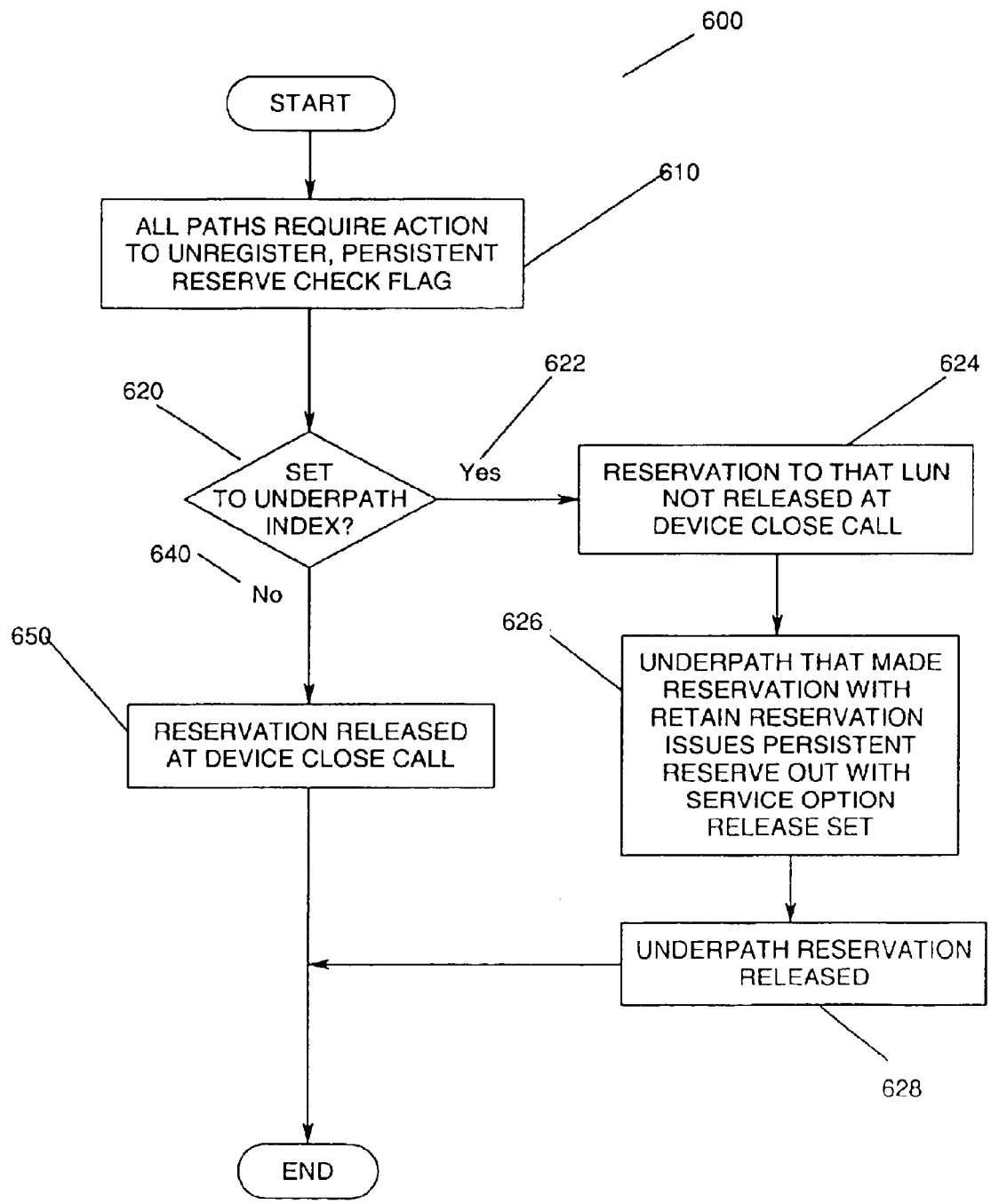
FIG. 6 illustrates a flow chart for a remove option for unregistering a path with a LUN.

FIG. 6 illustrates a flow chart 600 for a remove option for unregistering a path with a LUN. When a path is going to be removed, all the registered underpaths of the path require action to unregistered from the LUN. The persistent reservation is required to be released with that LUN before a path is removed 610. The path reserved flag is checked 620. If the flag is set to an underpath index 622, instead of −1, then the reservation to that LUN hasn't been released at device close call 624. This situation only occurs when the path was opened with the RETAIN RESERVATION flag being set, and it does not release the reservation at the device close call 626. If this is the case, the underpath which made reservation before will issue a Persistent Reserve Out with Release service action to release the reservation from the LUN 628.

Figure 7:
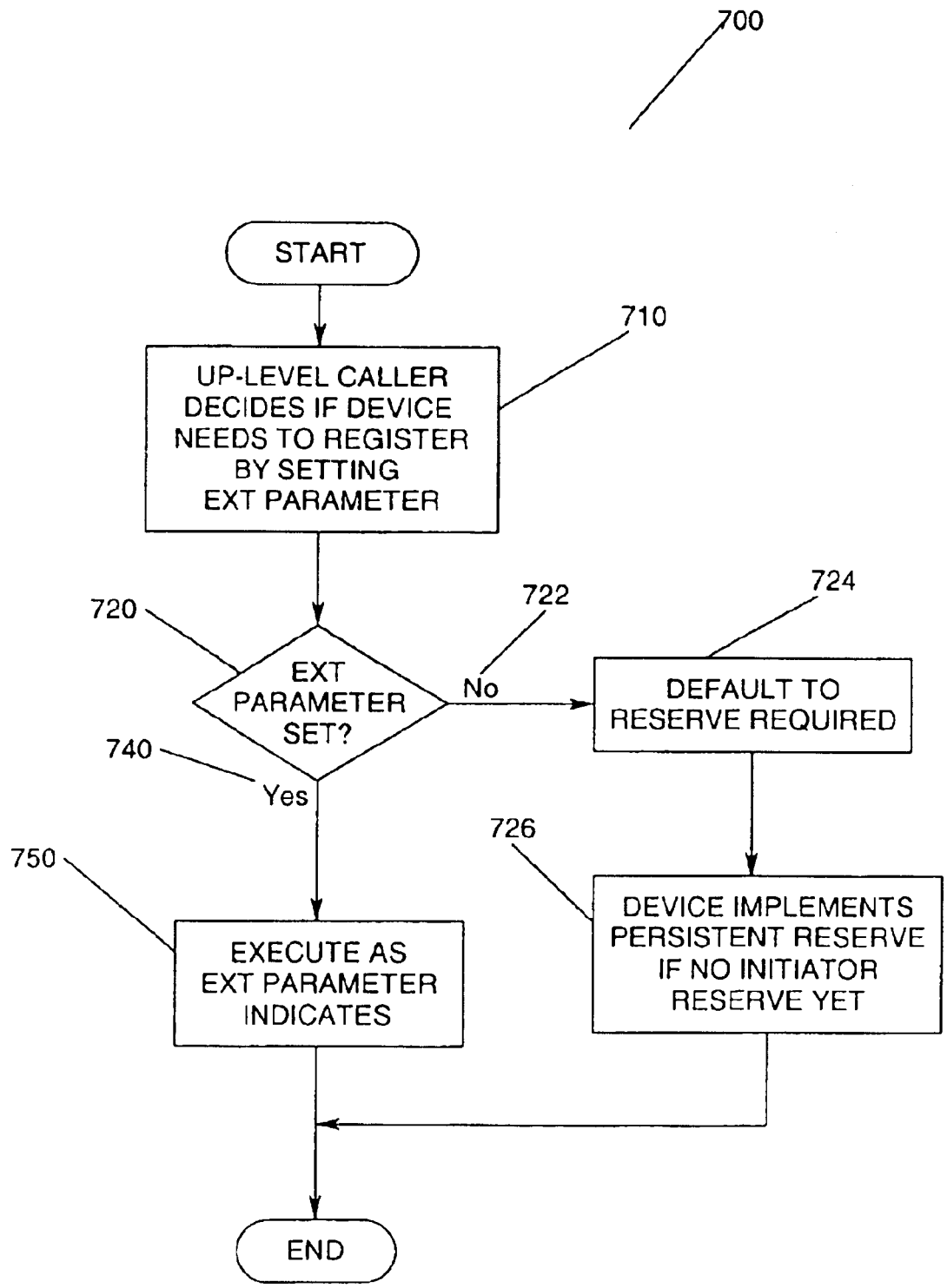
FIG. 7 illustrates a flow chart for a Reserve with a LUN.

FIG. 7 illustrates a flow chart 700 for a Reserve with a LUN. Whether a path needs to make a reservation to a LUN it is attached to or not is decided by the up level caller, such as operating system logical volume manager driver 710. The "ext" parameter of a device open options are examined 720. If the "ext" parameters are set 740, they will indicate the requirement for reservation 750. The valid option value of this "ext" parameter are:

| | |
|---|---|
| SC-FORCED-OPEN: | Do not honor device reservation-conflict status. |
| SC-RETAINRESERVATION: | Do not release device on close |
| SC-NO-RESERVE: | Prevents the reservation of the device during an open subroutine call to that device, Allows multiple hosts to share a device. |
| SC-SINGLE: | Places the selected device in Exclusive Access mode, |

If none of above options are set 722, the device open subroutine is default to Reserve required 724. The device implements persistent reserve to the LUN if no initiator has reserved this LUN yet 726. The following flow charts illustrate how each of these options are implemented with the SCSI-3 Persistent Reserve command.

Figure 8:
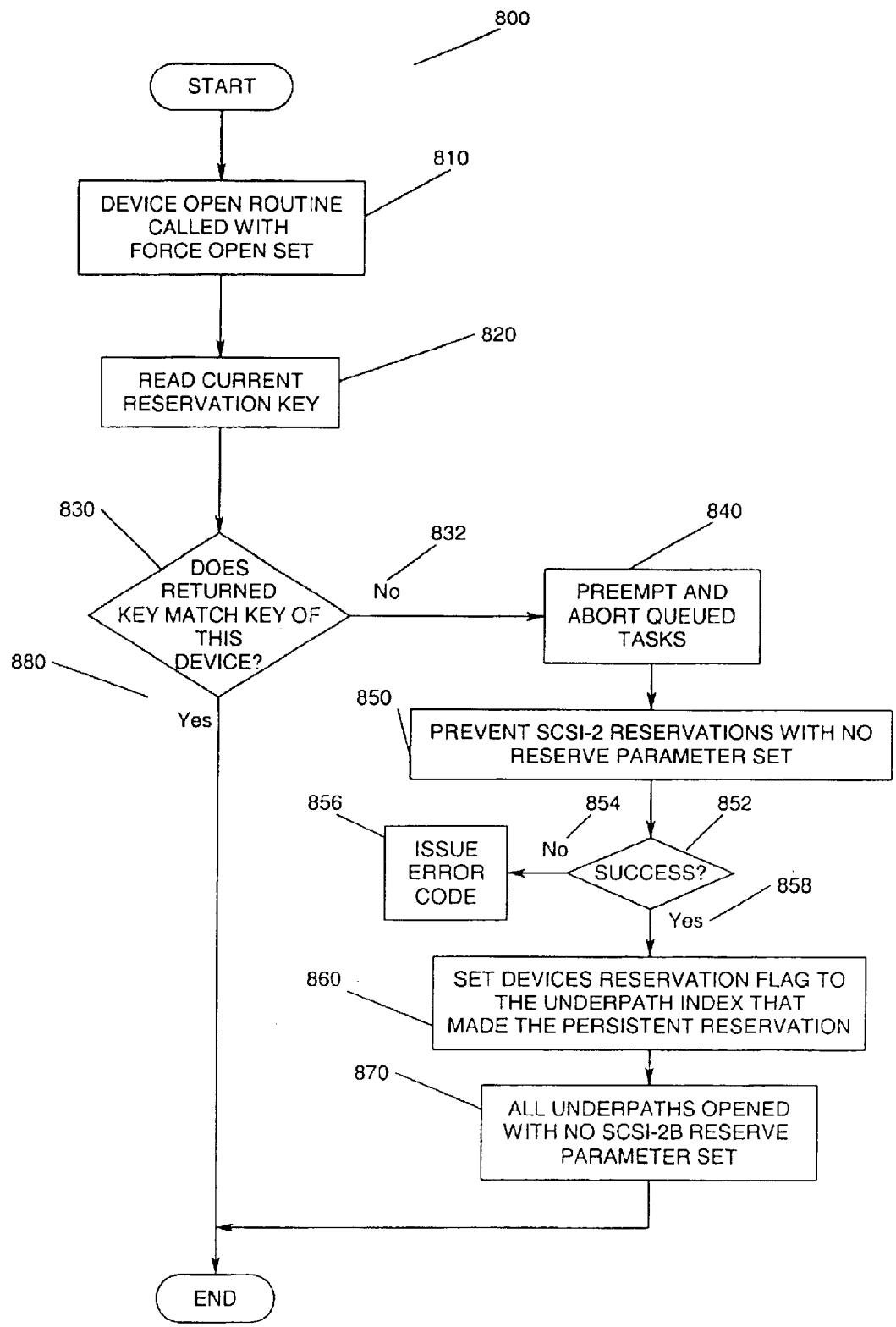
FIG. 8 illustrates a flow chart for the forced open option.

FIG. 8 illustrates a flow chart 800 for the forced open option. When device open subroutine is called with the forced open option being set 810, the device tries to read the current Persistent Reservation Key 820. If a key is returned, the device first checks if the reservation key matches its key 830. If it matches its key 880, the device does nothing because the LUN is reserved by the device. If a key is returned, and it does not match this device's reservation key 832, this reserved key is preempted and its queued tasks are aborted 840. The reservation of this LUN is stolen by this device and reservations are prevented by setting the no reservation parameter 850. A determination is made whether this command completes successfully 852. If this command does not complete successfully 854, an error code is issued 856. If this command completes successfully 858, the device's reserved flag is set to the underpath index, which made this reservation 860. All the registered underpaths are opened with SC-NO-RESERVE option set to "ext" parameter to the operating system disk driver open routine 870. The LUN can be accessed and shared by all the underpaths of the device that registered with the LUN.

Figure 9:
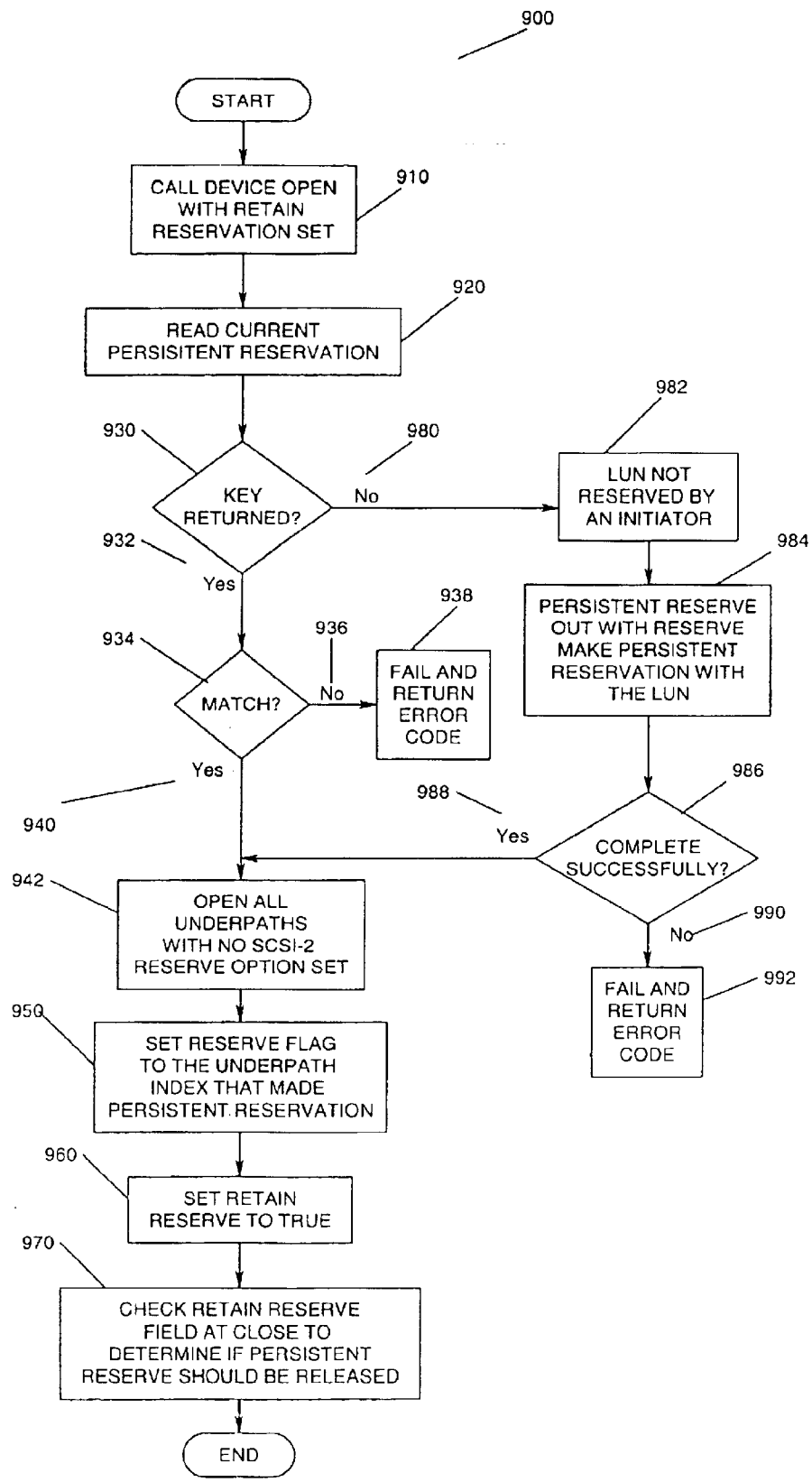
FIG. 9 illustrates a flow chart for the retain reservation open option.

FIG. 9 illustrates a flow chart 900 for the retain reservation open option. When device open subroutine is called with this option being set 910, the device will read the current persistent reservation key 920. A determination is made whether a key is returned 930. If there is no reservation key returned 980, that means the LUN is not reserved by any initiator 982, and the device will make the persistent reservation with the LUN 984. A determination is made whether the reservation is successful 986. If this reservation command fails 990, the system driver fails the open call to the caller with XXX error code 992. If this reservation command completes successfully 988, all the registered underpaths are opened with SC-NO-RESERVE option 942.

If there is a reservation key returned 932, a determination is made whether the key matches the device's reservation key 934. If it does not match this device's reservation key 936, the device indicates failure of the open call to the caller with XXX error code 938. If a returned key matches this device's reservation key 940, then all the underpaths are opened with SC NO RESERVE option set 942.

If all the underpaths are opened with no SCSI-2 reserve option set 942, the LUN can be accessed and shared by all the underpaths of this device, who registered with the LUN. The device's reserved flag is set to the underpath index, which made this reservation 950. The retain reserve field is set to TRUE 960. This field is checked at device close call to determine whether the persistent reserve should be released or not 970.

Figure 10:
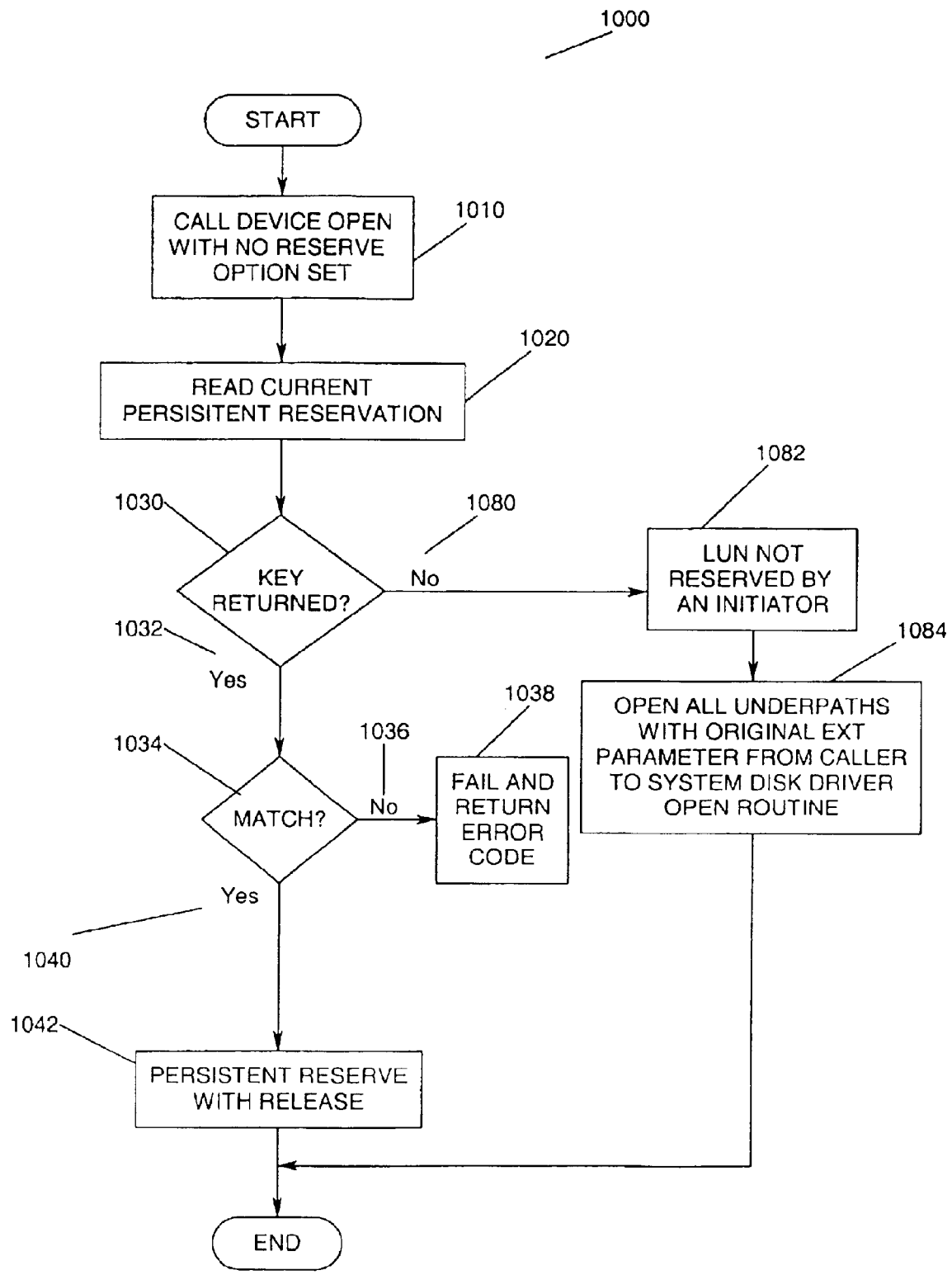
FIG. 10 illustrates a flow chart for the no reserve option.

FIG. 10 illustrates a flow chart 1000 for the no reserve option. When device open subroutine is called with this option being set 1010, the device will read the current persistent reservation key 1020. To implement this procedure, all the underpaths register with "Register and Ignore Existing Key" to make sure all the underpaths are registered with the LUN. If there is any underpath that has not registered with the LUN, that underpath will issue a Persistent Reserve Out command with the Register service action. If it fails again with this retry, this underpath will be ignored and skipped for the rest of operation. Then a registered underpath is selected to issue a Persistent Reserve In command with Read Reservation service action to get the current persistent reservation key.

A determination is made whether a key is returned 1030. If no reservation key is returned 1080, the LUN is not reserved by any initiator 1082. The device opens all its underpaths with the original "ext" parameter from the caller to the operating system disk driver open routine 1084.

If a current persistent reservation key is returned 1032, a determination is made whether it matches the device's reservation key 1034. If it matches this device's reservation key 1040, a Persistent Reserve command with Release service action is issued to release the persistent reservation with the LUN 1042; otherwise 1036, the system driver fails the open call to the caller with XXX error code 1038.

Figure 11:
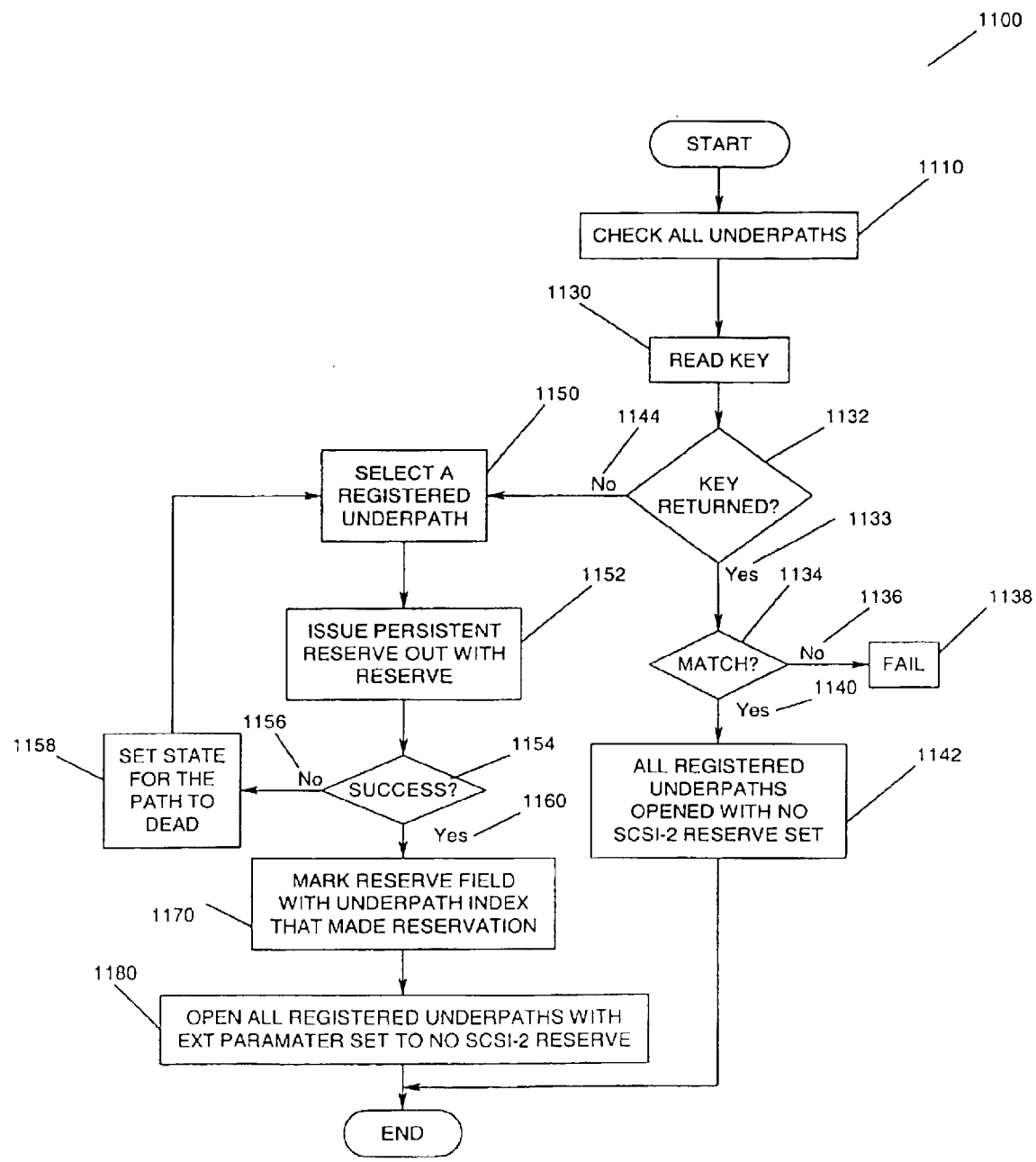
FIG. 11 illustrates a flow chart for the default reserve open option.

FIG. 11 illustrates a flow chart 1100 for the default reserve open option. When the device open subroutine is called with none of above listed option being set, the open is default to RESERVE required. All the underpaths are registered with the LUN regardless of whether they are already registered at the configuration phase 1110. An underpath will issue a Persistent Reserve Out command with "Register & Ignore Existing Key" service action. The device issues a Persistent Reserve In command with Read Reservation to get current persistent reservation key 1130. A determination is made whether a key is returned 1132. If the key is returned 1133, a determination is made whether the key matches the devices reservation key 1134. If it doese not match its own reservation key 1136, the driver fails the open call to the caller with EIO error code 1138. If the returned persistent reservation key matches the device's reservation key 1140, all the registered underpaths are opened with SC-NO-RESERVE set to "ext" parameter 1142. If no persistent reservation key is returned 1144, a registered underpath is selected 1150. A Persistent Reserve Out command with Reserve service action 1152 is issued to make a persistent reservation with the LUN. A determination is made whether the command completes successfully 1154. If successful 1160, the device marks the reserved field with the underpath index which made reservation with the LUN 1170. All the registered underpaths are opened with "ext" parameter set to SC NO RESERVE 1180. If the reservation command fails 1156, the driver fails the open call to the caller with EIO error code 1158.

Figure 12:
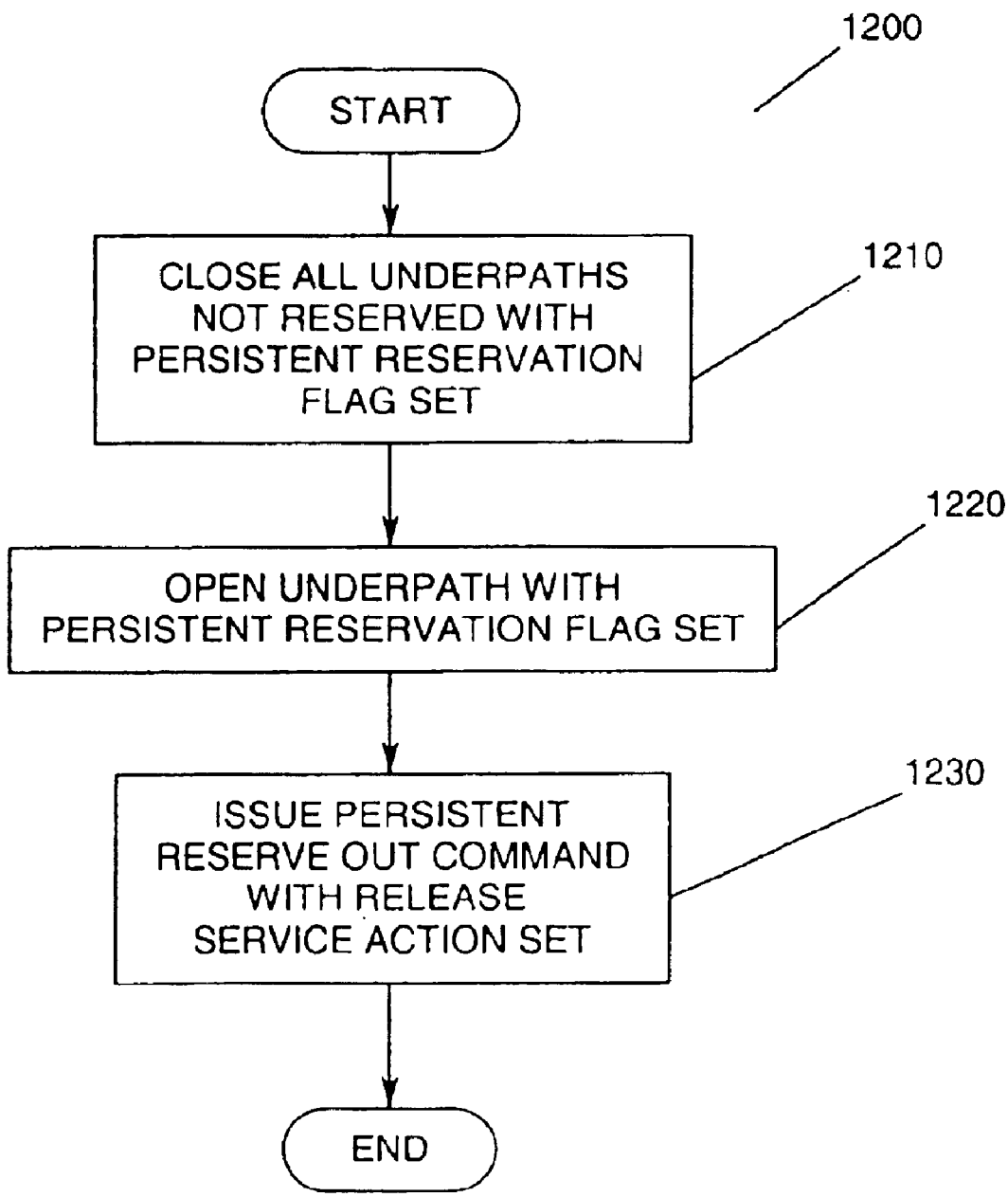
FIG. 12 illustrates a flow chart 1200 for the release with a LUN.

FIG. 12 illustrates a flow chart 1200 for the release with a LUN. When a device close routine is called, it should always release its persistent reserve to a LUN it is attached to, with the exception that its retain_reserve flag is set with TRUE, wherein the Persistent Reserve Out command with Release service action must be issued by the underpath, which made the reserve before and still holds the reserve. If this condition is not met, the request is ignored and Good Status is returned.

To implement this procedure, a driver closes all underpaths of the device first 1210, then opens the underpath that holds the reservation 1220. A Persistent Reserve Out command with Release Service action is issued to release the persistent reservation to the LUN 1230.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for providing access to a logical unit number of a shared storage system when a hardware failure occurs in a first of multiple input/output paths using a second of the multiple input/output paths, the method comprising mapping open options of the operating system to SCSI persistent reserve commands to allow all of the multiple paths to register with the logical unit number of the shared storage system and allowing the second of the multiple paths to access the logical unit number of the shared storage system after obtaining a persistent reservation with the shared storage system.

2. The method of claim 1 wherein the mapping open options of the operating system to SCSI persistent reserve commands to allow all of the multiple paths to register with the logical unit number of the shared storage system further comprises registering all paths from a first host with the logical unit number of the shared storage system using a single reservation key.

3. The method of claim 1 wherein the mapping open options of the operating system to SCSI persistent reserve commands further comprises obtaining information about persistent reservations and reservation keys.

4. The method of claim 3 wherein the obtaining information about persistent reservations and reservation keys further comprises using a reservation in command.

5. The method of claim 4 wherein the reservation in command comprises a read key service action and a read reservation service action.

6. The method of claim 1 wherein the mapping open options of the operating system to SCSI persistent reserve commands further comprises issuing a persistent reserve out command for initiating an action with the logical unit number of the shared storage system.

7. The method of claim 6 wherein the persistent reserve out command for initiating an action with a logical unit number of the shared storage system further comprises a service action chosen from the group consisting of register, reserve, release, clear, preempt and preempt with abort.

8. The method of claim 7 wherein the register service action comprises an add and a remove option.

9. The method of claim 7 wherein the add option further comprises:
registering each path when configuring;
determining whether a first registration attempt was a success;
attempting a second registration attempt when the first registration attempt was not a success, setting a state for the path as being dead when the second registration attempt is unsuccessful and ignoring the path when the path has a state set to dead; and
setting a state for the path to true when the first or second registration attempt is successful.

10. The method of claim 7 wherein the remove option further comprises:
determining whether a path has a persistent reservation;
issuing a persistent reserve out with service option release set when the path is determined to have a persistent reservation; and
releasing the reservation when the when the path is determined to not have a persistent reservation.

11. The method of claim 7 wherein the reserve service action comprises:
deciding whether a device needs to make a reservation to the logical unit number of the shared storage system by examining whether a command parameter is set;
defaulting to a reserve required when a command parameter is not set and implementing a persistent reserve to the logical unit number of the shared storage device when no initiator has reserved the logical unit number of the shared storage device; and
when a command parameter is set executing the command parameter.

12. The method of claim 11 wherein the command parameter is a forced open option, the forced open option causing the device to read the current reservation key, preempt and abort queued tasks when the current reservation key does not match the device's reservation key.

13. The method of claim 12 further comprising:
preventing reservations by setting the command parameter to no reserve;

determining whether the forced open completes successfully;

setting the device's reservation flag to the path index that made the reservation and opening all paths with no reserve option, set when the forced open command complete successfully; and issuing an error code when the forced open command does not complete successfully.

14. The method of claim 11 wherein the command parameter is a retain reservation option, the retain reservation causing the device to read the current reservation key, determine whether a key is returned, establish that the logical unit number is not reserved by an initiator and make persistent reservation when a key is not returned.

15. The method of claim 14 wherein the retain reservation option causes the device to determine whether a returned key matches a reservation key for the device, to issue an error code when the returned key does not match the reservation key for the device, and when the returned key matches the reservation key for the device open all paths with a no reserve option set, set a reserve flag to the path index that made the reservation, set the retain reserve to true and check a retain reserve field at close to determine if persistent reserve should be released.

16. The method of claim 11 wherein the command parameter is a no reserve option, the no reserve option causing the device to read the current reservation key, determine whether a key is returned, establish that the logical unit number is not reserved by an initiator and opening all paths with original command parameter from a host.

17. The method of claim 16 wherein the no reserve option causes the device to determine whether a returned key matches a reservation key for the device, to issue an error code when the returned key does not match the reservation key for the device, and when the returned key matches the reservation key for the device issue a persistent reserve out with release.

18. The method of claim 11 wherein the command parameter is a default reserve option, the default reserve option causing the device to check all paths, determine whether any paths are unregistered, register all unregistered paths, ignoring any paths that do not register successfully, return and read a reservation key, issuing an error code when the returned reservation key does not match a reservation key of the device and open all registered paths with no reserve set.

19. The method of claim 18 wherein the default reserve option causes the device when a key is not returned to select a registered path, issue a persistent reserve for the selected registered path, ignoring the path if the persistent reservation is not successful, and when the persistent reservation is successful marking a reserve field with the path index that made the reservation and open all registered paths with the command parameter set to no reserve.

20. The method of claim 11 wherein the command parameter is a single option, the single option causing the device to check all paths, determine whether any paths are unregistered, register all unregistered paths, ignoring any paths that do not register successfully, return and read a reservation key, issuing an error code when the returned reservation key does not match a reservation key of the device and open all registered paths with no reserve set.

21. The method of claim 20 wherein the single option causes the device when a key is not returned to select a registered path, issue a persistent reserve for the selected registered path, ignoring the path is the persistent reservation is not successful, and when the persistent reservation is successful marking a reserve field with the path index that made the reservation and open all registered paths with the command parameter set to no reserve.

22. The method of claim 7 wherein the release service action comprises:

closing all paths not reserved with a retain reservation option set;

opening a path with a retained reservation flag set; and issuing a persistent reserve out command with a release service action set to release a persistent reservation for a path.

23. A method for supporting SCSI persistent reserve commands by a shared storage system; comprising:

processing reservation keys to identify registered hosts; and processing persistent reservation commands to control access by a host.

24. The method of claim 23 wherein the processing of persistent reservation commands comprises allowing all of the multiple paths to register with the logical unit number of the shared storage system.

25. The method of claim 24 further comprising registering all paths from a first host with the logical unit number of the shared storage system using a single reservation key.

26. The method of claim 23 wherein the processing reservation keys comprises obtaining information about persistent reservations and reservation keys.

27. The method of claim 26 wherein the obtaining information about persistent reservations and reservation keys further comprises using a reservation in command.

28. The method of claim 27 wherein the reservation in command comprises a read key service action and a read reservation service action.

29. The method of claim 23 wherein the processing of persistent reservation commands comprises issuing a persistent reserve out command for initiating an action with the logical unit number of the shared storage system.

30. The method of claim 29 wherein the persistent reserve out command for initiating an action with a logical unit number of the shared storage system further comprises a service action chosen from the group consisting of register, reserve, release, clear, preempt and preempt with abort.

31. A driver for mapping open options of the operating system to SCSI persistent reserve commands, the driver configured to process reservation keys to identify registered hosts and to process persistent reservation commands to control access by a host.

32. The driver of claim 31 wherein the driver processes persistent reservation commands by allowing all of the multiple paths to register with the logical unit number of the shared storage system.

33. The driver of claim 32 wherein the driver registers all paths from a first host with the logical unit number of the shared storage system using a single reservation key.

34. The driver of claim 31 wherein the driver processes reservation keys by obtaining information about persistent reservations and reservation keys.

35. The driver of claim 34 wherein the driver obtains information about persistent reservations and reservation keys by using a reservation command.

36. The driver of claim 35 wherein the reservation command comprises a read key service action and a read reservation service action.

37. The driver of claim 31 wherein the driver processes persistent reservation commands by issuing a persistent reserve out command for initiating an action with the logical unit number of the shared storage system.

38. The driver of claim 37 wherein the persistent reserve out command for initiating an action with a logical unit number of the shared storage system further comprises a service action chosen from the group consisting of register, reserve, release, clear, preempt and preempt with abort.

* * * * *

UNITED STATES PATENT AND TRADEMARK OFFICE
CERTIFICATE OF CORRECTION

PATENT NO. : 6,954,881 B1
DATED : October 11, 2005
INVENTOR(S) : Flynn, Jr. et al.

It is certified that error appears in the above-identified patent and that said Letters Patent is hereby corrected as shown below:

Column 7,
Line 49, "LUN" should read -- LUN 0 130 --.
Line 50, delete "130".

Column 11,
Line 13, "doese" should read -- does --.

Column 12,
Line 46, "when the when the" should read -- when the --.

Signed and Sealed this

Twenty-ninth Day of November, 2005

JON W. DUDAS
*Director of the United States Patent and Trademark Office*